United States Patent

[11] 3,630,438

| [72] | Inventor | Allan M. Bickford<br>Huntington Station, N.Y. |
|---|---|---|
| [21] | Appl. No. | 824,015 |
| [22] | Filed | Sept. 17, 1968 |
| [45] | Patented | Dec. 28, 1971 |
| [73] | Assignee | The Foregger Company, Inc.<br>Roslyn Heights, N.Y.<br>Original application July 20, 1965, Ser. No. 473,300, now Patent No. 3,420,232, dated Jan. 7, 1969. Divided and this application Sept. 17, 1968, Ser. No. 824,015 |

[54] ANESTHETIC VAPORIZER
5 Claims, 14 Drawing Figs.

[52] U.S. Cl. ........................... 236/93, 138/46, 251/205
[51] Int. Cl. .................................. F16k 25/00

[50] Field of Search ........................... 138/46; 236/92, 93; 137/468

[56] References Cited
UNITED STATES PATENTS

| 2,830,621 | 4/1958 | Prescott | 236/93 X |
| 2,872,120 | 2/1959 | Weiland | 236/93 |
| 3,170,503 | 2/1965 | Isley | 137/468 X |
| 3,241,596 | 3/1966 | Isley | 137/468 X |
| 3,322,345 | 5/1967 | Getz | 138/46 X |

Primary Examiner—Harold W. Weakley
Attorney—Albert M. Parker

ABSTRACT: A gas control valve for an anesthetic vaporizer which compensates for temperature over a wide range to maintain a constant volume percentage of vaporized anesthetic in a fluid mixture despite changes in temperature or in rate of flow of the mixture.

Patented Dec. 28, 1971
3,630,438
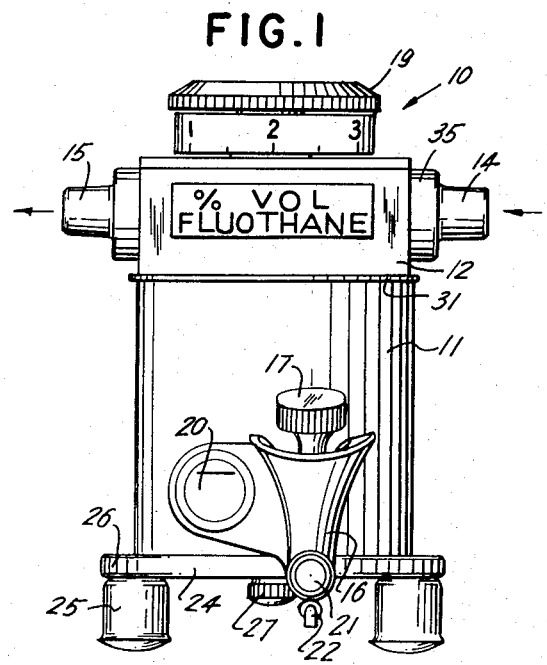
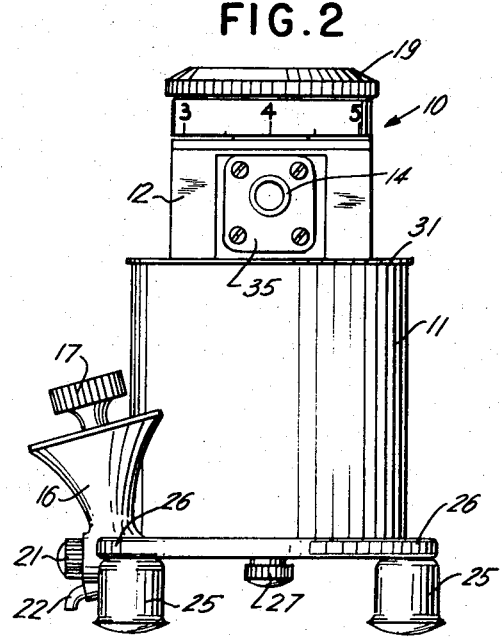
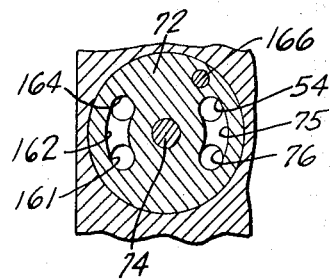
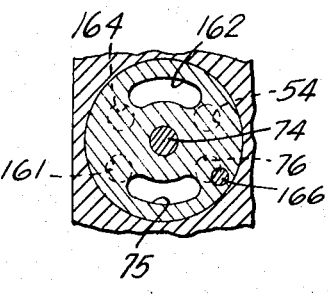
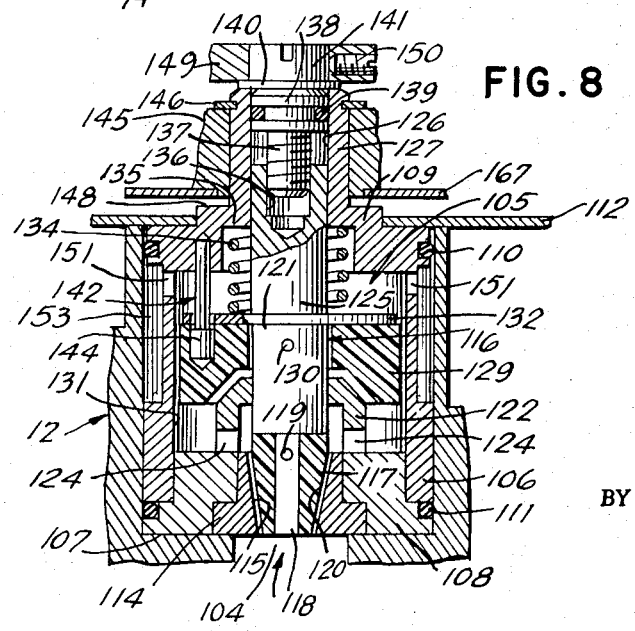
INVENTOR.
ALLAN M. BICKFORD
BY Albert M. Parker
ATTORNEY

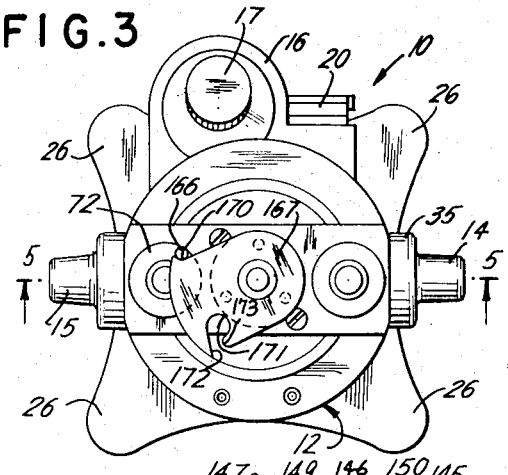
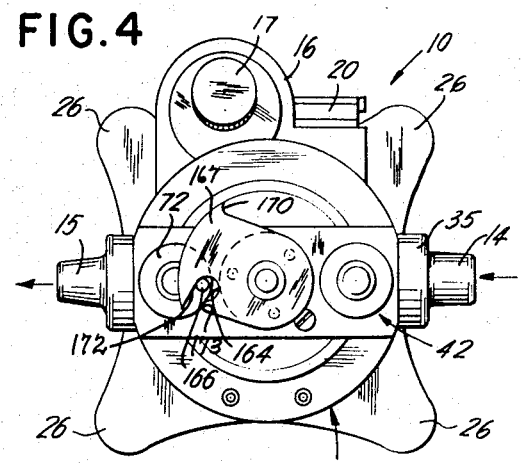
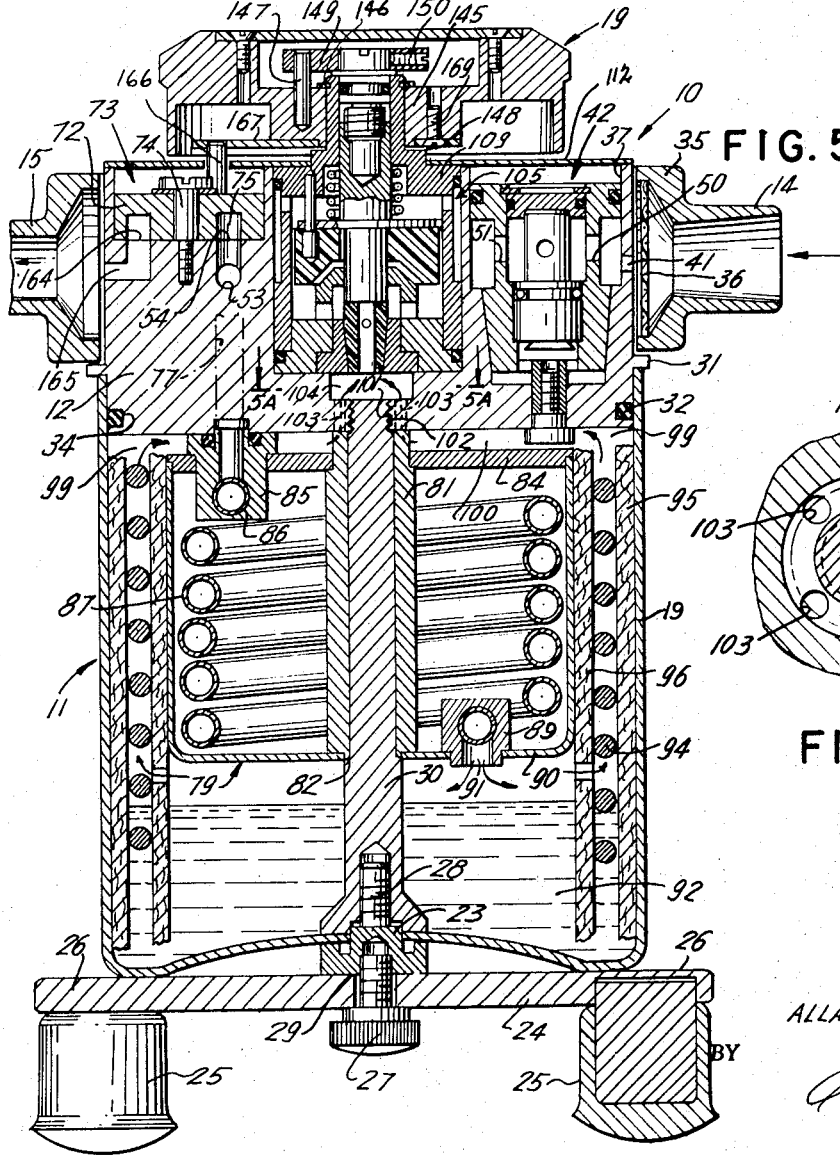

Patented Dec. 28, 1971

INVENTOR.
ALLAN M. BICKFORD
BY
Albert M. Parker
ATTORNEY

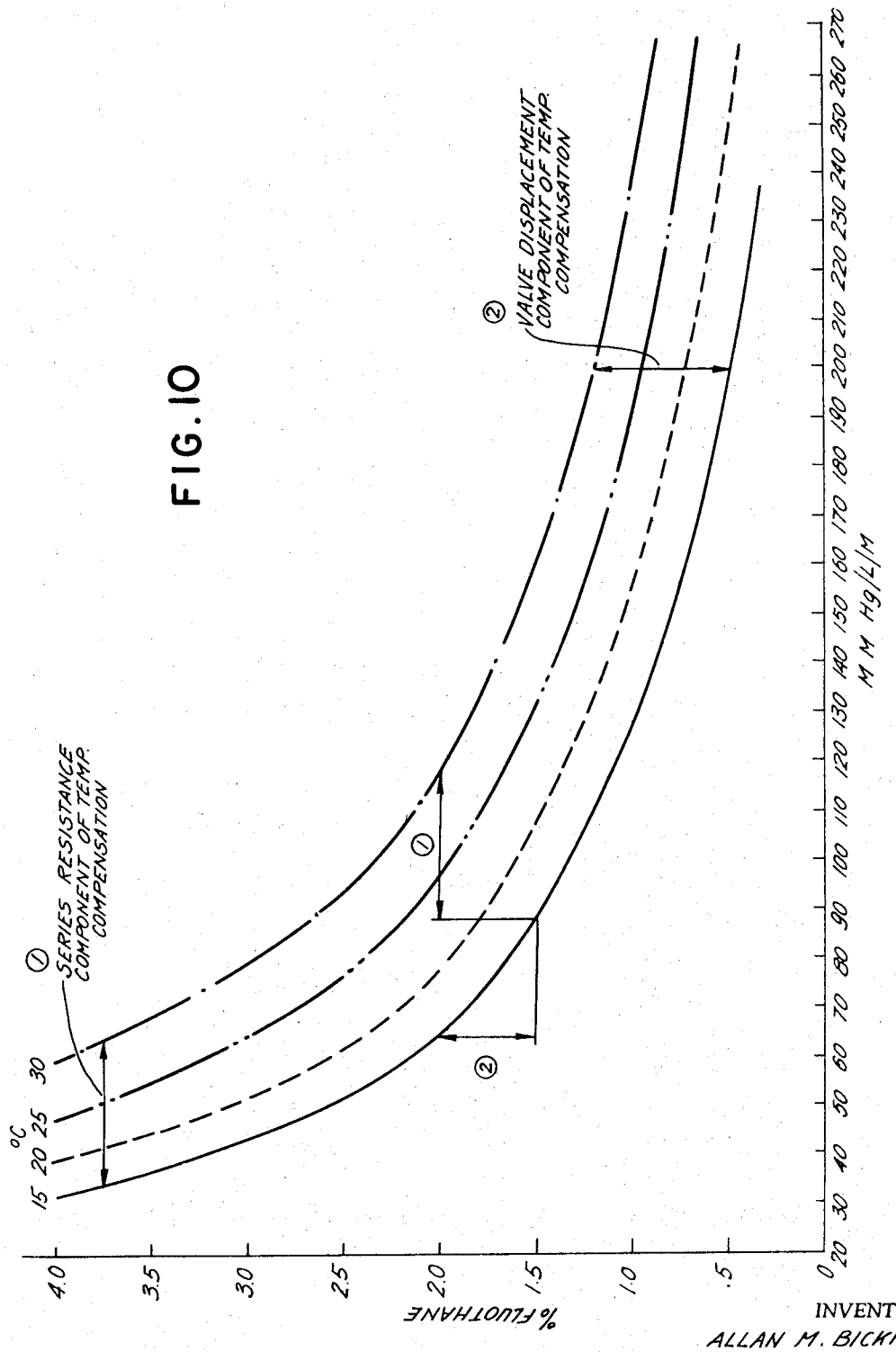

Patented Dec. 28, 1971
3,630,438
5 Sheets-Sheet 5
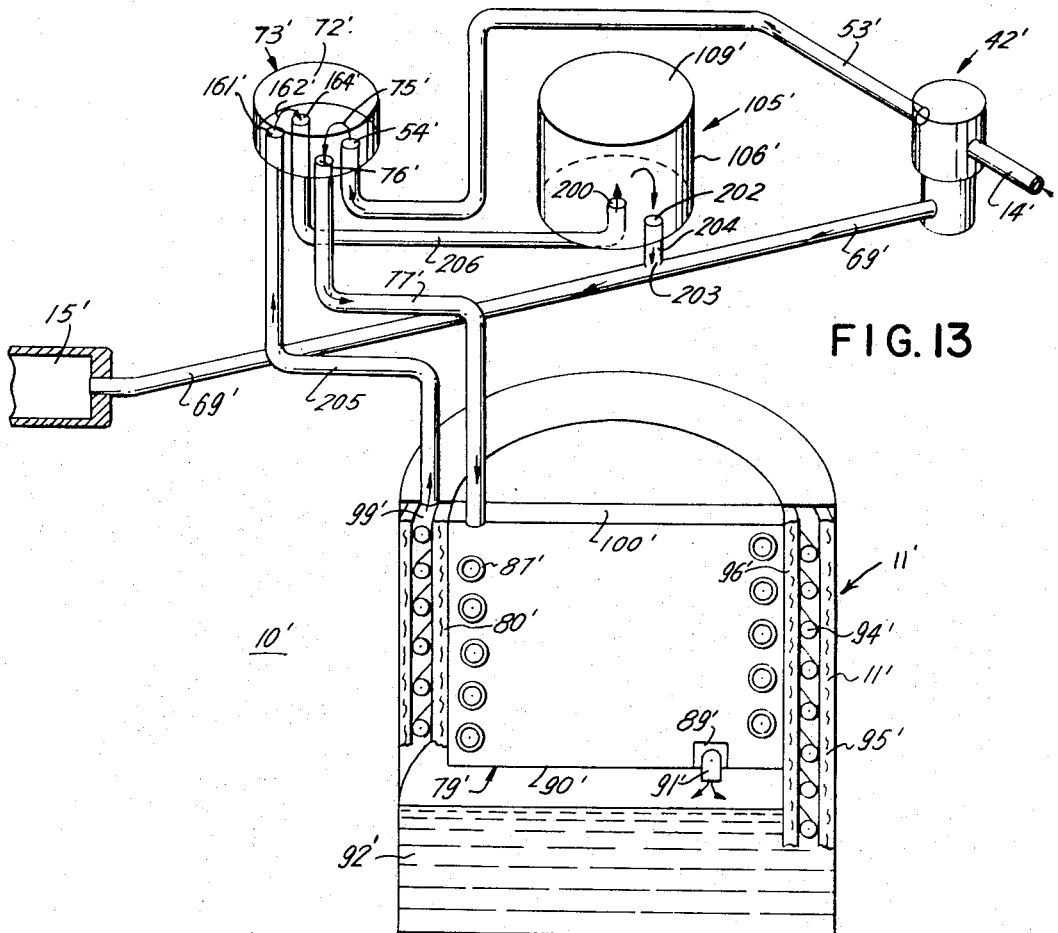
FIG. 13
FIG. 11
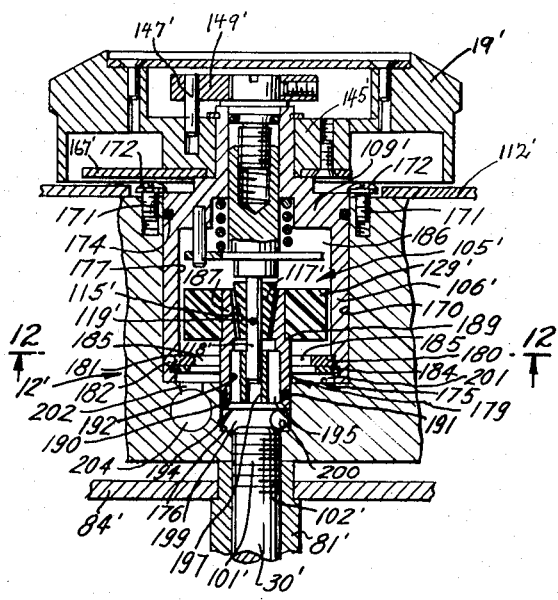
FIG. 12
INVENTOR.
ALLAN M. BICKFORD
BY
*Albert M. Parker*
ATTORNEY

ANESTHETIC VAPORIZER

This application is a division of application Ser. No. 473,300 filed July 20, 1965 for ANESTHETIC VAPORIZER, now U.S. Pat. No. 3,420,232.

This invention relates to anesthesia apparatus, and more particularly relates to an anesthetic vaporizer wherein liquid anesthetic is vaporized and entrained in a carrier gas for delivery to a patient's breathing circuit.

Anesthetic vaporizers of the type with which the present invention is concerned may employ, for example, an anesthetic such as fluothane, sometimes called "Halothane," which is administered to the patient in the form of a vapor mixed with a gas such as oxygen or air. The anesthetic is provided in liquid form in the bottom of a closed chamber, a portion of the carrier gas being circulated across the top of the liquid anesthetic and over wicking saturated with the anesthetic so as to vaporize it and to become mixed with it. The resulting mixture is then led through a control valve which meters it in the desired percentage to mix with the main gas stream, the final gas and vaporized anesthetic mixture being then discharged into the breathing circuit.

The concentration of vaporized anesthetic, that is, its percentage volume, that can be contained in a saturated mixture of carrier gas and vaporized anesthetic is dependent upon the vapor pressure of the liquid anesthetic. The vapor pressure of the liquid anesthetic varies with temperature. Accordingly, it is highly desirable to employ in the apparatus temperature-responsive means for controlling the rate of flow of the vaporized anesthetic gas mixture so that the percentage of anesthetic in the mixture delivered to the patient shall remain substantially constant.

An object of the invention lies in the provision of an improved anesthetic vaporizer which is particularly characterized by its ease of control and its maintenance of a substantially constant percentage of vaporized anesthetic which it delivers despite changes in temperature and in the rate of flow of the carrier gas-vaporized anesthetic mixture.

Another object of the invention lies in the provision, in an anesthetic vaporizer, of an improved, novel temperature-compensating valve device.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in side elevation of a first illustrative embodiment of anesthetic vaporizer made in accordance with the invention;

FIG. 2 is a view in end elevation of such vaporizer, the view being taken from a position at the right of FIG. 1 and looking to the left;

FIG. 3 is a view in plan of the vaporizer of FIGS. 1 and 2, the common operating knob for the adjustable gas control valve and the shutoff valve being removed for clarity of illustration, the means interconnecting such valves being shown in the position which it occupies when both such valves are open;

FIG. 4 is a view similar to FIG. 3 but with the means connecting the flow control and the shut off valves being shown in the position which it occupies when such valves are closed;

FIG. 5 is a view in vertical cross section through the vertical axis of the first embodiment of the apparatus, the section being taken along the line 5—5 looking in the direction of the arrows in FIG. 3, certain of the parts being shown in elevation, the central valve, for controlling the rate of flow of the anesthetic gas mixture, being shown in closed position;

FIG. 5A is a fragmentary view in horizontal section through an intermediate portion of the apparatus, the section being taken along the line 5A—5A of FIG. 5 looking in the direction of the arrows:

FIG. 6 is a fragmentary view in horizontal section through the shutoff valve in its open position;

FIG. 7 is a view similar to FIG. 6 but with the movable valve element of the shutoff valve being turned to its closed position;

FIG. 8 is an enlarged view in vertical axial section through the valve controlling the rate of flow of the anesthetic gas mixture, certain of the elements being shown in elevation, the valve being shown opened somewhat from the closed position thereof shown in FIG. 5;

Figure 9:
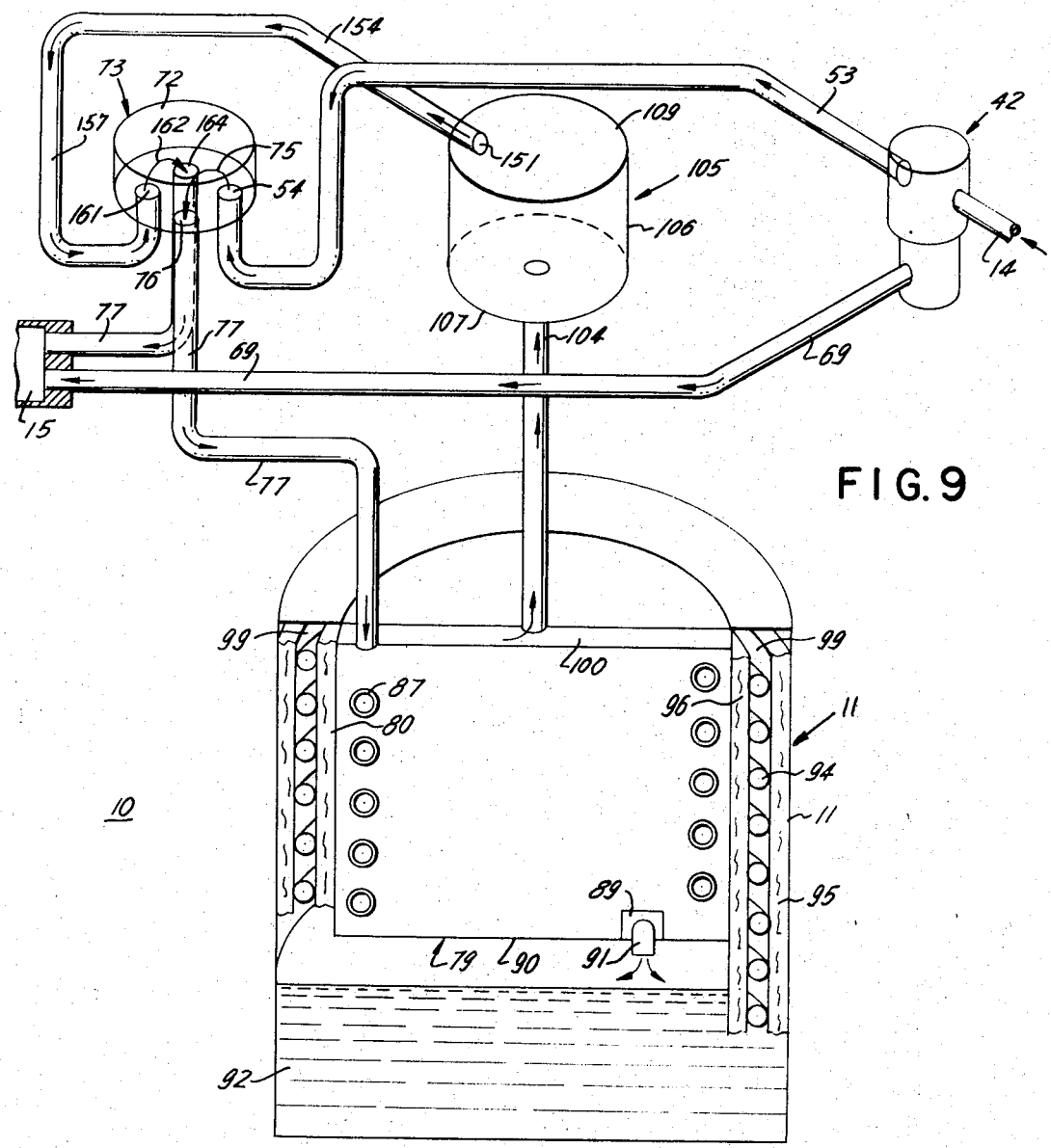
FIG. 9 is a schematic view in perspective of the first embodiment of the apparatus showing the paths of flow of the gas, the vaporized anesthetic, and the mixture of vaporized anesthetic and gas and also showing the valves for their control, the shutoff valve being shown in its open position.

FIG. 10 is a graph showing the percentage by volume of a volatilized anesthetic, specifically fluothane, plotted along the vertical coordinate, against the resistance presented by the control valve to the flow of gas therethrough, designated mm. Hg/L/M, along the horizontal coordinate, the graph showing curves corresponding to each of four representative temperatures encountered in an operating room;

FIG. 11 is a view in vertical axial section through the valve controlling the rate of flow of the anesthetic gas mixture in a second, preferred embodiment of the anesthesia apparatus of the invention, certain of the elements being shown in elevation, the valve being opened somewhat;

FIG. 12 is an enlarged view in horizontal section through such valve of the second embodiment of the apparatus, the section being taken along the line 12—12 of FIG. 11 looking in the direction of the arrows; and FIG. 13 is a schematic view in perspective of the second embodiment of the apparatus showing the paths of flow of the gas, the vaporized anesthetic, and the mixture of vaporized anesthetic and gas and also showing the valves for their control, the shutoff valve being shown in its open position.

As will be apparent from the above, there are shown and described herein two embodiments of apparatus in accordance with the invention. The first embodiment of such apparatus is shown in FIGS. 1–9, inclusive. The second, presently preferred embodiment, is shown in FIGS. 11, 12, and 13.

The first embodiment of anesthetic vaporizer shown, which is generally designated by the reference character 10, has a main outer container 11 which in use is sealed except for the various valves and conduits contained in the body 12 which is applied and sealed to the container shown. The head 12 is provided with a gas inlet nipple 14 which, in the embodiment shown, is of the internally tapered type, and with a nipple 15 of the externally tapered type through which the mixture of volatilized anesthetic and carrier gas is delivered. Device 10 is provided with a funnel 16 adjacent the base thereof through which liquid anesthetic is supplied to the space within the lower end of the container 11. The funnel is closed by a stopper 17. The rate of flow of the volatilized anesthetic gas mixture is controlled by a valve generally designated 105, to be described, which may be adjusted by a rotatable knob 19 disposed at the top of the apparatus. The container 11 is provided with a sight glass 20 through which the level of liquid anesthetic in the container may be observed, and with a drain valve having an operating knob 21 and a drainpipe 22 through which liquid anesthetic may be withdrawn from the apparatus when desired.

The apparatus 10 is provided with a baseplate 24 having four projecting ears 26 to each of which a rubber-covered foot 25 is attached. A centrally disposed upwardly directed thumb screw 27 secures the baseplate 24 to a fitting 29 which is secured to the bottom of the container 11 by a central pilot portion 23 which projects through a central hole in the bottom of the container and is sealed thereto. Fitting 29 has an upstanding threaded stem 28 which is threadedly connected to and secures the lower end of a central standard 30 in the form of an upstanding rod which is disposed centrally within the container 11. The upper end of standard 30 is threaded at 101 (FIGS. 5 and 5A) and is screwed into the block 12 constituting the head of the apparatus to secure such block to the container 11. The lower end of the block or head 12 is telescoped within the upper end of container 11, the head having an annular outwardly projecting flange 31 which rests upon the upper edge of the sidewall 19 of the container 11. The head 12 is sealed to such sidewall of the container by an O-ring 32 which is disposed within an annular groove 34 adjacent the lower end of the head 12.

The gas inlet nipple 14 forms a part of an inlet fitting 35 which is secured to an end of the block 12, as shown. Within the fitting 35 and across the inner larger portion of the flared passage therethrough there is secured a filter 36. Gas entering the nipple 14 passes through the filter 36 and into an inlet port 41 on the end of the block 12 to which the fitting 35 is secured. Port 41 opens into a first cavity 37 in the head 12 in which there is disposed a bypass valve 42, to be described. The head 12 contains two other cavities, a central cavity 39 containing a gas flow control valve 105, and a third cavity 40 containing an inlet and outlet shutoff valve 73. Such cavities and the valves contained therein are disposed in alignment, as shown in FIG. 5.

GENERAL OPERATION OF THE APPARATUS OF FIGS. 1—9 INCLUSIVE

Briefly, gas introduced into the apparatus through the inlet fitting 35 in its normal flow passes into the cavity 37, thence through the now open shutoff valve 73, and from there flows through a coil which provides a chamber of substantial volume and length therefor. From the coil the gas flows downwardly across the top of the liquid anesthetic and upward in a spiral path defined between turns of a coiled wire 94, which is walled between outer and inner wicking members 95 and 96, respectively. The gas thus progressively becomes saturated with anesthetic vapor to form a mixture. Such mixture is then led upwardly into the central gas flow control valve 105, from which it flows to a second part of the shutoff valve 73 and thence to the outlet fitting 15. The bypass valve 42 normally provides a direct path between the inlet fitting 14 and the outlet fitting 15 at a controlled rate, and at a greater rate should the pressure in the gas exceed a predetermined desired maximum.

The Gas Control Valve

The structure of the gas control valve 105 is shown in FIGS. 5 and 8. As shown particularly in FIG. 8, the valve 105 has an outer generally circular cylindrical housing having a lower end portion and an upper end portion 109. Housing 106, 109 is accurately received within the cavity 39 in the valve-containing block 12. Such cavity 39 has a bottom wall 107 which is centrally apertured to provide the above-described chamber 104. The upper end portion 109 of the housing of the valve 105 is sealed to the sidewall of the cavity 39 at the upper end thereof by an O-ring 110 received within a groove in such upper portion 109 of the housing. The housing of the valve includes a bottom member 108 of stepped configuration; the upper smaller diametered portion of member 108 is telescoped into the lower end of the housing portion 106. The lower end of housing portion 106 and the radially outward lower end portion of member 108 are sealed to the sidewall of the cavity 39 adjacent the lower end thereof by an O-ring 111, as shown. The larger diameter lower portion of the top member 109 of the housing of valve 105 is disposed beneath a sheet metal cover member 112 which is retained upon the top of block 12 and which also covers the pressure relief valve 42 and the shutoff valve 73, as shown in FIG. 5.

The gas control valve 105 has a first fixed valve seat 115 which is formed in a central insert member 114 of stepped configuration, the member 114 being received within a bore and counterbore in member 108, as shown, and overlying the bottom wall 107 of the cavity 39 in its central portion so that member 114 is fixed and sealed to member 108. Member 114, in the illustrative embodiment, as well as housing 106, 109 and member 108, are formed of stainless steel, which has a coefficient of linear expansion on the order of $9.6 \times 10^{-6}$ per degree C. The valve seat 115 has a relatively small conical angle on the order, for example, of 15°. Telescoped within the fixed valve seat 115 is a member 117 which has a frustoconical outer surface 120 which is complementary to the valve seat 115 and thus forms the second seat of the valve. In the illustrative embodiment the member 117 is formed as a sleeve of plastic material having a relatively large positive linear coefficient of thermal expansion, that is, the material expands upon an increase in temperature. Preferably, member 117 is made of a fluorocarbon plastic material of which polytetrafluoroethylene is one preferred example. Such material, which is also known as PTFE or TFE, has a linear coefficient of thermal expansion on the order of $10 \times 10^{-6}$ per degree C. Such material is highly resistant to attack by the anesthetics encountered in the use of the apparatus, including fluothane. Member 117 may also be made of other materials having generally similar properties, with suitable changes in the diameters of member 117 and of seat 115 to accommodate for the different coefficient of thermal expansion of the different materials used. The surface of the valve seat 120 on member 117 coacts with the valve seat 115, and the member 129, to be described, coacts with the inner sidewall of the housing 106, 109, so as to provide the valve 105 with temperature-compensating characteristics whereby to maintain the percentage of volatile anesthetic in the anesthetic gas mixture substantially within the relationships illustrated in the graph of FIG. 10.

The passage through valve 105 proper, taken with its attendant passages, is such that its length is much greater than its width, the ratio length/width being on the order of 100 or more. Consequently, the flow of the gas anesthetic vapor mixture therethrough is laminar.

The member 117 is connected to form a part of a vertically reciprocable adjustable valve stem whereby the effective cross section of the passage between the valve seats 115 and 120 may be adjusted manually. Thus the valve has a central stem member 116 having a lower central pin portion 118 of reduced diameter over which the member 117 is telescoped. Member 117 is retained upon such lower pin portion 118 by a cross pin 119 which penetrates both members.

The above-described lower member 108 of the valve housing has a central sleeve portion 122 rising thereabove, the upper end of portion 122 being formed as an inwardly projecting flange which guidingly receives the valve stem 116 somewhat above the portion 118 thereof. The main portion of the sidewall of member 122 is spaced somewhat radially from the valve stem 116. Such sidewall is provided with a plurality (two shown) of radially directed passages 124 which permit gas entering the valve from chamber 104 and passing between the valve seats 115 and 120 to flow radially outwardly into the cavity within the side housing member 106. The upper end of the valve stem 116 is of circular cylindrical shape and is accurately guidingly received within the vertical central bore 126 of an upstanding central sleeve portion 127 of the above-described upper housing member 109 for the valve. The valve stem 116 is thus accurately guided for vertical adjustment along the common axis of the two valve seats 115 and 120.

The valve 105 is provided with the further temperature-compensating means 129, 106 briefly referred to above. Mounted upon the valve stem 116 so as to lie coaxial thereof is a generally disk-shaped member 129 which is telescoped over the valve stem and is secured thereto by a transverse pin 130 projecting through the member 129 and the valve stem. To shorten the valve 105 vertically, in the embodiment shown, the central portion of member 129 is provided with an upwardly converging frustoconical recess into which the similarly shaped upper end of part 122 projects. Members 129 and 122 do not contact each other at any time. Member 129 is, like member 117, formed of plastic material having a relatively large thermal coefficient of expansion. Member 129 may be formed of the same materials as member 117.

The member 129, which is of circular cylindrical external configuration, has an outer diameter which is somewhat less than that of the bore 131 of the sidewall casing member 106 of the valve. The annular space thus provided between the periphery of the member 129 and the bore 131 of the valve casing is disposed in series with the lower part of the valve cavity and the outlet port 151 which is disposed at the upper end of the housing 106, 109. Such annular passage decreases upon an increase in temperature by reason of the much greater coefficient of expansion of member 129 as compared to member 106, 109.

The valve stem 116 is constantly urged in a downward, valve-closing direction, by a coil compression spring 134 which is disposed between an upper annular spring seat 135 on member 109 and a disk-shaped plate member 132 which overlies member 129, and to which the valve stem 116 is affixed by being telescoped through the member 132. As shown, the plate 132 is disposed in engagement with an annular shoulder between the upper largest diameter portion 125 of valve stem 116 and a lower slightly smaller diameter portion 121 thereof. The valve stem 116 is adjusted vertically by an adjusting screw 137 which is threadedly received within a central bore 136 in the upper end of portion 125 of the valve stem. The screw 137 has an enlarged head portion 138 which has an annular groove therein receiving an O-ring 139 which seals the head of the screw to the wall of the bore 136 in member 127. Above such head 138 the screw 137 is provided with a flange 140 which rests upon the upper edge of the sleeve 127 and prevents downward travel of the screw. Thus turning of the screw 137 in one direction permits the spring 134 to advance the valve stem 116 toward its lower, closed position, and the turning of the screw in the opposite direction raises the valve stem against the opposition of spring 134.

The valve stem 116 and the member 129 attached thereto are prevented from rotation by means of a pin 142; the upper end of such pin has a press fit with a downwardly open passage in the lower end of housing portion 109. The lower end 144 of pin 142 is slidably received through a hole in plate member 132 and within a bore in member 129. Thus portion 144 of pin 142 may slide freely with respect to members 129 and 132 as the valve stem 116 is raised and lowered. The pin 142, however, prevents the valve stem 116 from rotating when the valve-adjusting screw 137 is turned.

The apparatus shown incorporates means whereby the valve 105 may be adjusted without subjecting the valve stem 116 to sidewise forces which might alter the effective area of passage between the valve seats 115 and 120 without the turning of the valve stem. Thus the adjusting knob 19 of valve 105 is provided with a hub 145 which is journaled upon the outer surface of the upwardly projecting sleevelike upper end portion of member 109. Such hub 145 rests upon a shoulder 148 at the base of such sleevelike member and is retained upon the member by a spring ring 146 which is snapped into a groove at the upper end of the sleevelike member and overlies the central portion of the hub. Mounted upon the crank member 149 as by being press-fitted thereinto is a downwardly projecting pin 147, the lower end of which extends into a hole somewhat larger than the pin located in the hub 145. The crank member 149 is retained upon the head 141 of the adjusting screw 137

The Operating Means for Valves 105 and 73

In the embodiment of the apparatus shown, the valve 105 is opened upon the turning of the valve-adjusting knob 19 clockwise, and is closed upon the turning of the knob 19 counterclockwise (FIGS. 3 and 4). The apparatus incorporates means whereby the turning of the knob 19 both adjusts the valve 105 and operates the shutoff valve 73.

The valve-operating means is such that upon the turning of the knob 19 clockwise toward its open position from the closed position FIG. 4), the shutoff valve 73 is opened during the first fraction of a turn of the knob 19, as shown in FIG. 3, and upon turning of the knob 19 counterclockwise to close the valve 105, the shutoff valve 73 is closed as the knob 19 reaches its closed position. Such means linking the valves 105 and 73 is shown more particularly in FIGS. 3, 4, and 5. As shown there, the rotatable valve element 72 of valve 73 is provided with an upstanding pin 166. Pin 166, when the shutoff valve 73 is open, lies in the position shown in FIGS. 3 and 12, and when the shutoff valve is closed lies in the position shown in FIGS. 4 and 13. Attached to the hub 145 of the knob 19 at its lower end is a part circular plate 167 having a generally radially projecting arm with a radius which somewhat exceeds the distance which the pin 166 lies from the axis of the hub 145 in either the open or closed positions of the shutoff valve. As shown, plate 167 is attached to the hub 145 by a plurality of machine screws, of which one is designated 169.

The plate 167 has on one edge of its arm adjacent its radially outer end a pocket 171 which, in the closed positions of both valves 105 and 73 shown in FIG. 4 receives pin 166 therewithin. The pocket 171 is in the form of more than half of a circle. The radially outer side of the entrance passage to such pocket 171 is in the form of a straight surface 172; the radially inner side of such entrance passage is smoothly convexly rounded, as shown at 173. The other edge of plate 167 has a shallow arcuate pocket 170 therein located to receive the pin 166 when both valves 105 and 73 are turned to their fully open positions, shown in FIG. 3.

To open valves 105 and 73, the knob 19 is turned clockwise from its closed position of FIG. 4. In the first part of such clockwise turning of knob 19, the pin 166 is contacted by the convex surface 173 on plate 167, and thus the pin and the valve element 72 of valve 73 are turned counterclockwise sufficiently to open valve 73. Thereafter the knob 19 may be turned further in a clockwise direction to adjust the valve 105 to the desired rate of flow of the anesthetic gas mixture therethrough. Such adjusted position of the knob 19 will ordinarily lie somewhat short of the fully open position of valve 105 shown in FIG. 3. At such fully open position, the pin 166 is received within the pocket 170, which with pin 166 serves as a mechanical stop for the valve 105 in its fully open position.

When it is desired to shut off the apparatus 10, the knob 19 is then turned counterclockwise, whereupon the valve 105 is not only closed but the pin 166 is then contacted by the outer end of the camlike surface 172, so that the pin enters the pocket 171. The pin 166 with the movable valve element 72 of the shutoff valve 73 on which it is mounted are thus turned clockwise into the position shown in FIG. 4, wherein the movable valve element 72 occupies the closed position shown in FIG. 7, upon such encounter between pocket 171 of member 167 and the pin 166. Further turning of the knob 19 in a counterclockwise direction is prevented by engagement between the bottom of pocket 171 and the pin 166, as shown in FIG. 4. The bottom of such pocket and the pin thus function as a mechanical stop for valve 105 in its closed position.

The Operation of the Temperature-Compensating Valve

The manner of operation of the valve 105 in maintaining the set percentage of fluothane constant despite changes in ambient temperature will be clear upon consideration of FIG. 10 and the following discussion. FIG. 10 is a graph showing the percentage by volume of a volatilized anesthetic, specifically fluothane, plotted along the vertical coordinate against the resistance presented by the control valve 105 to the flow of gas therethrough, such resistance being designated mm. Hg/L/M along the horizontal coordinate, the graph showing four curves, each corresponding to a respective representative temperature which might be encountered in an operating room. In the above expression for resistance gas flow, mm. Hg means pressure in millimeters of mercury, L means liters, and M means minutes.

If a plot is made of valve position against the resistance to fluid flow therethrough of any valve, it will make a curve generally similar to the graph of FIG. 10 in which the ordinate represents the degree of valve opening, and the resistance to fluid (gas) flow is represented by the abscissa. With the valve open, the resistance to flow will be at its minimum, having a value somewhat in excess of zero. As the valve approaches its closed position, the resistance to fluid flow through the valve approaches infinity.

In order to maintain a given percentage of anesthetic (fluothane) in the gas vapor mixture administered to the patient, the resistance to flow of the mixture through the valve must be changed with temperature to compensate for the ability of the gas to absorb more fluothane as the temperature increases. The four curves shown in FIG. 10 indicate the resistance to gas flow which is required of the valve 105 for each of the temperatures indicated in order that the valve will deliver a mixture having fluothane present in the desired percentage by volume. It will be seen that a temperature-responsive resistance to gas flow in series with a valve would adequately compensate the high-percentage ends of the curves with a required spread of approximately 30 resistance units (mm. Hg/L/M) over the temperature range of 15°–30+ C. This is shown by the horizontal double arrow 1 at the upper left-hand ends of the curves.

However, a 30-resistance-unit change near the lower volume percentage settings of the valve would be far short of the required change in resistance to gas flow. At the low-percentage end a vertical displacement of the movable valve element 117 of the valve 105 over a range of approximately 0.75 percent by volume of fluothane (the double arrow labeled 2 at the lower right-hand end of the curves) would be an ideal approximation for correction over the temperature range 15°–30° C. But this alone would be inadequate as a corrective measure at the high-percentage end of the curves, as can be seen by reference to the intermediate double arrow 2.

In accordance with the invention, the required temperature compensation is secured by employing two elements affecting the rate of flow of gas through the valve as a function of temperature: (1) a series element composed of parts 129, 131 (106, 109), and (2) a "displacement" element 117. The expansion and contraction of the element 117 is equivalent to an axial displacement, that is, movement up and down, respectively, relative to valve seat 115, or rotation of knob 19 to produce axial movement of the valve element 117. The diameters and lengths of the elements 117 and 129 are selected to provide the desired degree of change with temperature of the resistance to flow of the gas through the valve 105. The two resistance components 1 and 2 combine over the desired ranges of temperature and percentage by volume of fluothane to provide for the desired temperature compensation.

The manner in which the apparatus functions to produce the results shown in the curves of FIG. 10 will perhaps be better understood by reference to an analogous electrical circuit wherein there is a network composed of a resistance $R_1$ (corresponding to the bypass valve 42) and a variable resistance $R_2$ (corresponding to the valve 105) connected in parallel with resistance $R_1$, a current $L_T$ (corresponding to the rate of total gas flow) flowing to, through, and away from the network, and a voltage (corresponding to the drop in gas pressure through the apparatus) applied across the network. The current flowing through the resistance $R_1$ (corresponding to the rate of flow of gas through the bypass valve 42) is designated $I_1$, and that flowing through the resistance $R_2$ (corresponding to the rate of flow of gas through the valve 105) is designated $I_2$. (It will be seen that $R_1$ is substantially constant, as is the resistance to gas flow through the normally partially open valve 42 and its attendant passages.)

By analogy, what is desired is to set and maintain substantially constant the current (gas flow) ratio $I_2/I_1$ over a wide range of variation of the total current $I_T$ (total gas flow). In the electrical circuit it can be seen, by applying Ohm's law, that the ratio of the two currents $I_2/I_1$ is proportional to the ratio of the resistances $R_1/R_2$. The above-described valve 105 with its two associated temperature compensating elements function in accordance with Ohm's law, and thus maintain a constant ratio $$\frac{\text{Rate of gas flow through valve 105}}{\text{Rate of gas flow through valve 42}}$$

over a wide range of the total rate of flow of the gas.

It is known from the physics of fluid flow that if laminar flow is maintained in a fluid-conducting passage (at subsonic velocities) the resistance to the flow of fluid offered by the passage will be in accordance with the pressure/flow rate. As we have seen above, the passages through each of valves 42 and 105, where resistance is desired, are constructed so that the length is much greater than the width, the ratio length/width being on the order of 100 or greater. As a result of the described construction of the vaporizer, a typical vaporizer made in accordance with the invention maintains the desired percentage by volume of anesthetic, determined by the setting of knob 19, over a range of gas flow at the input connection 14 of from 0.5 to 10 liters per minute.

THE EMBODIMENT OF FIGS. 11, 12, and 13

In FIGS. 11, 12, and 13 there is shown a second embodiment of anesthesia apparatus in accordance with the present invention. Such apparatus, in general, differs from that of the above first-described embodiment of the apparatus in that the passages in the head of the apparatus, here designated 12', are somewhat simplified, that the second portion of the composite shutoff valve 73' is disposed in advance of the gas-controlling valve 105' rather than following it, and that the gas-volatilized anesthetic mixture travels first upwardly and then downwardly within the valve 105'. The embodiment of FIGS. 11, 12, and 13 is presently preferred over the first-described embodiment and apparatus, since it avoids interference with the flow of the gas anesthetic mixture which may sometimes occur within valve 105 by reason of condensation of the anesthetic caused by the pressure drop in the path between the valve seats 117 and 120 and the pressure drop in the path between the the outer surface of the body 129 and the inner surface of the bore 131 of valve 105. Although the apparatus of the first described embodiment operates satisfactorily, it has been found that condensed anesthetic therewithin at times may tend to be drawn down past the member 129, thus partially obstructing such second path. The apparatus of the second embodiment overcomes such difficulty.

Further, in the first described embodiment the interior of valve 105 remains connected to a substantial gas mixture carrying part of the system through ports 151 and passages 154, 157 even though the valve 105 is closed. Thus condensate from the anesthetic may tend to collect in the valve. In the system of FIGS. 11, 12, and 13, however, upon the closing of the gas-controlling valve 105' the interior of the valve above the engaging valve seats thereof is isolated from the parts of the system which carry the gas anesthetic mixture. The upper and laterally outer portions of the cavity within valve 105' remain open to the carrier gas bypassed by valve 42', however, so that the interior of the valve 105' is then swept clear of any anesthetic condensate which may have formed therein.

In FIGS. 11, 12, and 13 parts which are the same as or generally the same as those of the first-described embodiment are designated by the same reference characters but with added primes. Parts which differ substantially from those of the first-described embodiment are designated by different reference characters. The head or block 12' of the apparatus is provided with a bore 170 which is open to the top of the block. Within such bore there is disposed an outer valve body 109', which may be made of stainless steel of the same type as body 109 of the valve 105, such body 109' having a lower circular cylindrical sleeve portion 106' snugly fitting within the bore 170. The inner surface 177 of sleeve 106' is in the form of a circular cylinder coaxial with bore 170. The valve body 109' is retained in the valve block 12' by machine screws 171 having heads 172 the outer portions of which overlie the upper edge of the valve body 109'. Body 109' is sealed to the bore 170 adjacent its upper end by an O-ring 174 which is received within an annular groove in body 109'. The bore 170 terminates at the bottom in a transverse annular surface 175, block 12' being further provided with a small central bore 176 which extends downwardly from surface 175 coaxial with bore 170. The lower end of bore 176 is employed as a part of the passage means for introducing the gas anesthetic mixture into the valve 105' in a manner to be described.

The lower, gas anesthetic receiving end portion of the valve 105' includes a generally circular cylindrical member 179, the lower end of which is snugly received within the bore 176 and is sealed thereto by an O-ring 191. Intermediate the length of the member 179 and positioned somewhat above the lower end surface 175 of bore 170, there is a radially outwardly extending transverse flange 180, the outer end of which fits within a seat 181 provided in the lower end of the sleeve 106'. The flange 180 and thus the member 179 are retained in the position shown in FIG. 11 by a spring ring 182 which is snapped into an annular groove 184 in the inner surface of the sleeve 106' beneath the flange 180. The flange 180 is provided with a plurality (four shown) of holes 185 therethrough to furnish communication between the upper part 186 of the cavity within the body 109' with the space 201 below the flange 180.

The upper portion of the body 179 is in the form of an upstanding sleeve 187 having an upwardly diverging frustoconical valve seat 115' coaxial with the member 179. Valve seat 115' cooperates with the outer surface of a downwardly converging frustoconical valve sleeve 117', the outer surface of which is complementary to the valve seat 115'. Member 117' is formed of the same material and functions similarly to the sleeve member 117 of the first-described embodiment. The outer surface of the upper portion of body 179 is provided with a portion of smaller diameter terminating in an annular shoulder. The temperature responsive body 129', which is in the form of a thick centrally perforated disk, is snugly and accurately received over the upper end of body 179 and is supported upon the said annular shoulder.

Centrally within the bore 192 within the lower portion 190 of member 179 there is disposed a guide insert 194, the structure of which is more particularly shown in FIG. 12. Member 194 has a generally sine-shaped peripheral surface, the peaks 196 of which snugly engage the surface of bore 192 in portion 190 of member 179. The spaces 195 between successive peaks 196 of the guide member 194 provide passages for conducting the gas anesthetic mixture upwardly to the cooperating valve seats of the valve 105'. Member 194 is provided with a central bore 197 which receives and guides the depending free end of the pin 118' upon which the valve member 117' is mounted.

In the construction of FIGS. 11, 12, and 13, the central stem member 30' which rises within the container 11' is secured and sealed to the lower end of the valve block 12' by being screwed thereto through the medium of interfitting threads 101' on member 30' and threads 102' in a bore at the lower end of block 12' coaxial with bores 170 and 176. As before, the central stem member 30' is provided with a sleeve 81', the upper end of the sleeve abutting the lower end of block 12'. The cover plate 84' is supported upon a shoulder adjacent the upper end of the sleeve 81'. It will thus be seen that the space 201 of valve 105' is closed except for the passage 200 leading thereinto.

The gas anesthetic mixture in this embodiment is introduced into the valve 105' through a passage 200 in block 12', the inner end of passage 200 terminating at a chamber 199 which lies within the block above the upper end of the stem member 30'. Such mixture then rises through the passages 195 presented between the guide member 194 and the bore 192 and then gasses between the spaced frustoconical valve seats of the valve 105'. The upper end of the upper space 186 within the valve body 109' is closed in this embodiment. The mixture therefore after passing between the valve seats then flows downwardly through the path presented between the outer peripheral surface of the body 129' and the bore 177, through the holes 185 and into a discharge passage 201 through the surface 175 and thence into a further passage 204. Thus as above explained the path of the gas anesthetic mixture through valve 105' is first upwardly through the first manually adjustable valve and thence downwardly between the temperature-responsive member 129' and bore 177 from which the periphery of member 129' is spaced a small distance which varies with temperature.

The differences in the paths of flow of the gas anesthetic mixture between the first and second embodiments will be readily seen by comparing FIG. 13 with FIG. 9. Thus in FIG. 13 the gas anesthetic mixture is shown rising to the shutoff valve 73' through a pipe 205, the mixture being lead from valve 73' to the gas controlling valve 105' through a pipe 206 which communicates with the above-described passage 200. The mixture is then shown passing upwardly within the body 109' of the valve 105' and thence downwardly into the passages 202, 204. Finally, such mixture is lead directly to the passage 69' which leads to the fitting 15' connected to the patient's breathing circuit.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

What is claimed is:

1. A gas control valve comprising a housing having a longitudinally extending bore therein, an inlet port in the housing at one end of the bore, and an outlet port in the housing markedly spaced longitudinally thereof from the inlet port, one of the ports being disposed axially of the housing and having a first, central valve seat, a longitudinally reciprocable valve element disposed axially within the bore in the housing, said valve element having a second valve seat cooperating with the first valve seat selectively to close the said one port and to open it to varying degrees upon reciprocation of the valve element within the bore, and means defining a gas conducting passage in the housing between the inlet and outlet ports, said passage including the path between the valve seats; an annular member mounted within the bore in the housing generally coaxial thereof, the peripheral surface of the annular member being spaced radially inwardly a short distance from the surface of the bore to define a portion of said passage, the annular member being made of plastic material having a high positive coefficient of thermal expansion which is substantially greater than that of the housing in the position thereof confronting said annular member, the passage between the annular and the bore of the housing being disposed in series with the path between the valve seats, said gas-conducting passage having a length much greater than its width, the ratio of length to width of said passage being about 100 to 1 or more, so that the flow of gas between said valve seats is laminar, one of said seats of the valve being made of a plastic material having a high positive coefficient of thermal expansion responsive to changes in temperature whereby to constrict said passage upon a rise in temperature and to increase the area of said passage upon a decrease in temperature.

2. A gas control valve as claimed in claim 1, wherein the annular member is affixed to and moves with the valve element coaxially thereof.

3. A gas control valve as claimed in claim 1, wherein the annular member is fixedly mounted with respect to the housing of the valve.

4. A gas control valve as claimed in claim 1, wherein the seats of the valve are in the form of coaxial frustums of cones of small apex angle, and one of said seats is telescoped within the other.

5. A gas control valve as claimed in claim 4, wherein the means forming one of said seats is a sleeve of plastic material, said one seat being an extended frustoconical peripheral surface on said sleeve.

* * * * *

PO-1050
(5/69)

UNITED STATES PATENT OFFICE
CERTIFICATE OF CORRECTION

Patent No. 3,630,438            Dated December 28, 1971

Inventor(s)              Allan M. Bickford

It is certified that error appears in the above-identified patent and that said Letters Patent are hereby corrected as shown below:

Column 5, after line 61, insert the following:

--by a set screw 150. It will thus be seen that sidewise forces exerted upon the knob 19, as by the resting of the operator's hand thereon, are isolated from the adjusting screw 137, the screw being subjected only to turning movement caused by the intersection of the pin 147 and the crank member 149.

Column 7, line 14, "15°-30+C" should read --15-30°C--.

Signed and sealed this 27th day of June 1972.

(SEAL)
Attest:

EDWARD M. FLETCHER, JR.
Attesting Officer

ROBERT GOTTSCHALK
Commissioner of Patents